United States Patent
Zhao et al.

(10) Patent No.: US 7,974,981 B2
(45) Date of Patent: Jul. 5, 2011

(54) MULTI-VALUE PROPERTY STORAGE AND QUERY SUPPORT

(75) Inventors: Lei Zhao, Sammamish, WA (US); Yanbiao Zhao, Bellevue, WA (US); Lijiang Fang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 587 days.

(21) Appl. No.: 11/780,242

(22) Filed: Jul. 19, 2007

(65) Prior Publication Data

US 2009/0024654 A1  Jan. 22, 2009

(51) Int. Cl.
*G06F 7/00* (2006.01)
(52) U.S. Cl. .................... 707/769; 707/779
(58) Field of Classification Search .......... 707/1–10, 707/103, 769, 779, 999.001–999.01
See application file for complete search history.

(56) References Cited

U.S. PATENT DOCUMENTS

| | | | |
|---|---|---|---|
| 6,016,497 A | 1/2000 | Suver | |
| 6,704,747 B1 | 3/2004 | Fong | |
| 6,865,576 B1 | 3/2005 | Gong et al. | |
| 6,892,204 B2 | 5/2005 | Haas et al. | |
| 7,162,488 B2 | 1/2007 | DeVorchik et al. | |
| 2002/0161904 A1* | 10/2002 | Tredoux et al. | 709/229 |
| 2003/0037039 A1* | 2/2003 | Mah et al. | 707/1 |
| 2005/0091256 A1 | 4/2005 | Rathakrishnan et al. | |
| 2005/0154745 A1 | 7/2005 | Hansen et al. | |
| 2005/0177560 A1* | 8/2005 | Morioka | 707/3 |
| 2005/0198019 A1 | 9/2005 | Cunningham et al. | |
| 2005/0262097 A1* | 11/2005 | Sim-Tang et al. | 707/10 |
| 2006/0004745 A1* | 1/2006 | Kuhn et al. | 707/4 |

OTHER PUBLICATIONS

Daniel J. Abadi, et al., "Column-Stores For Wide and Sparse Data," MIT, http://www.mit.edu/~dna/abadicidr07.pdf.
Kevin Wilkinson, "Jena Property Table Design," Hewlett-Packard Laboratories, Palo Alto, CA, Apr. 28, 2006, (pp. 1-8), http://jena.hpl.hp.com/juc2006/proccedings/wilkinson/paper.pdf.
Ronald Bourret, "XML Database Products: XML-Enabled Databases," http://www.rpbourret.com/xml/ProdsXMLEnabled.htm.

* cited by examiner

*Primary Examiner* — Mohammad Ali
*Assistant Examiner* — John P Hocker
(74) *Attorney, Agent, or Firm* — Merchant & Gould

(57) ABSTRACT

Optimized storage and query of multi-value properties is enabled by generating a base table for single value properties associated with a user-defined schema and a number of row-based tables for each different type of multi-value properties. By combining multi-value properties into row-based tables or even into compatible type tables, a number of tables to be created for a database system such as SQL system is reduced at the same time optimizing create/read/update/delete operations.

13 Claims, 6 Drawing Sheets

102

| Asset Key | Prop. Name | Prop. Type | Prop. Value |
|---|---|---|---|
| 110001 | Title | String | Test Document |
| 110002 | Exp. Date | Date | 01/01/2008 |
| 110003 | Version | Integer | 3 |
| • | | | |
| • | | | |
| • | | | |
| | | | |
| | | | |

104

| Asset Key | Prop. Name | Prop. Type | Prop. Value 1 |
|---|---|---|---|
| 112001 | Authors | String | John Doe |
| 112001 | Authors | String | John Smith |
| 112002 | Mod. Date | Date | 02/03/2004 |
| 112002 | Mod. Date | Date | 03/04/2004 |
| 112002 | Mod. Date | Date | 04/05/2005 |
| • | | | |
| • | | | |
| • | | | |

106

| Asset Key | Prop. Name | Prop. Type | Prop. Value |
|---|---|---|---|
| 110001 | Title | String | Test Document |
| 110002 | Exp. Date | Date | 01/01/2008 |
| 110003 | Version | Integer | 3 |
| 112001 | Authors | String | John Doe |
| 112003 | Category | Integer | 1 |
| 112001 | Authors | String | Jane Doe |
| 112003 | Category | Integer | 3 |
| | | | |

*FIG. 1*

MULTI-VALUE PROPERTY STORAGE AND QUERY SUPPORT

BACKGROUND

User interactions in a networked environment with a multitude of documents or files such as document searches in digital libraries, the Internet, and organizational intranets involve queries through at least one database system (e.g. Structured Query Language "SQL" systems). A significant portion of such interactions include user defined schemas that have to be mapped to a form understandable by the database system, such as SQL server tables.

Mapping the user defined schemas to tables in SQL becomes much more complicated when the schema includes multi-value properties. Because of inherent limitations of SQL databases, multiple tables may have to be used to store the data of such schema. Table numbers may increase rapidly along with the complexity of the SQL statement used to query (or update) the data store.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to mapping multi-value properties of assets to multiple tables such that a relatively simple SQL query can be formed. To accommodate a mix of single and multi-value properties a base table may be formed using the single value properties only. Then multi-value properties of compatible types are grouped in row-based tables substantially reducing a number of tables needed to store the data in the SQL environment.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 1 illustrates example tables of single value, multi-value, and a mix of single value and multi-value properties;

DETAILED DESCRIPTION

Figure 2:
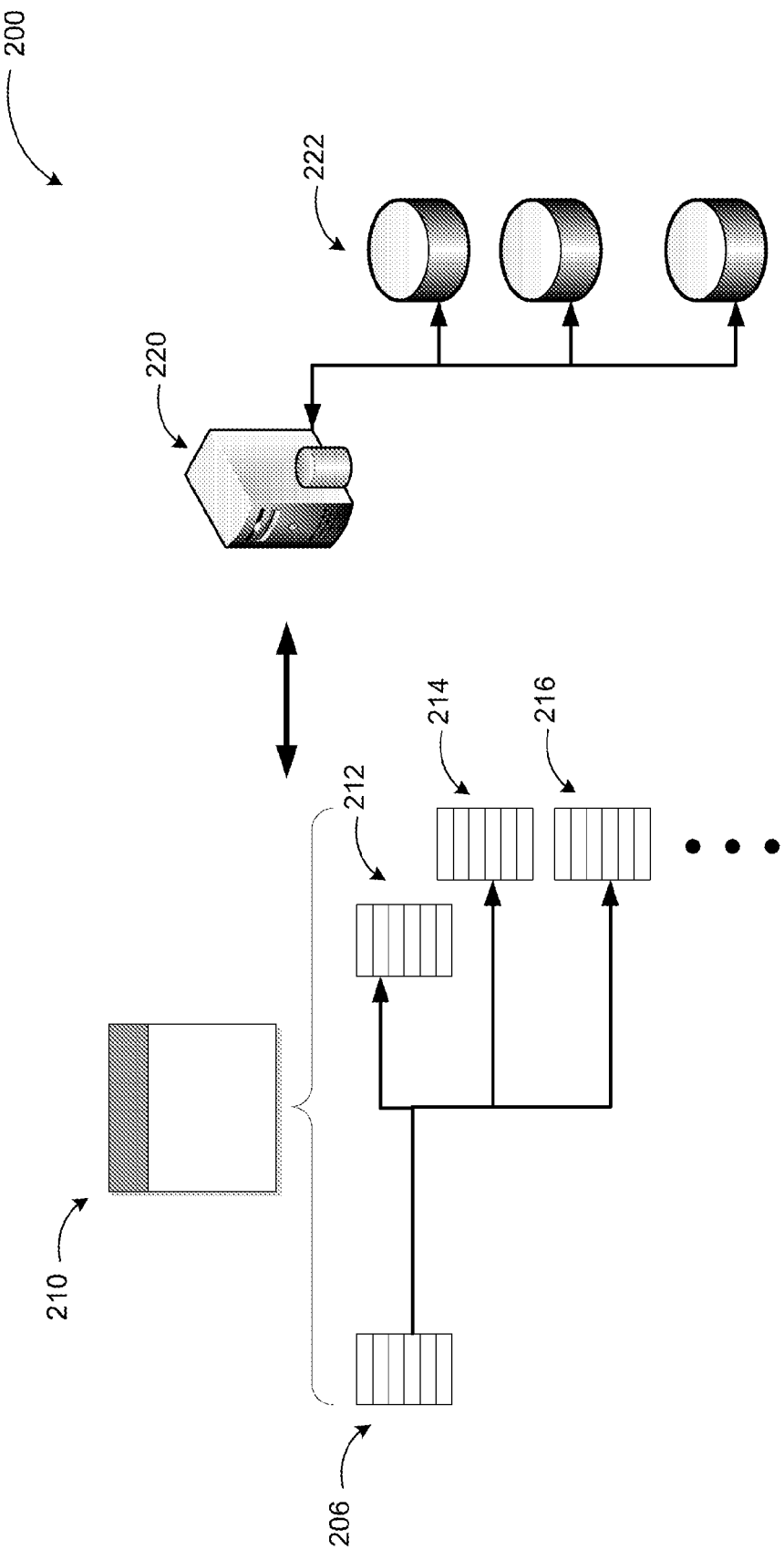
FIG. 2 is a conceptual diagram illustrating how single and multi-value properties are transformed into base and row-based tables to SQL based operations.

As briefly described above, user defined schemas may be mapped to a combination of base and row-based tables based on compatible types of multi-value properties for efficient query execution in SQL environments. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Referring to FIG. 1, example tables of single value, multi-value, and a mix of single value and multi-value properties are illustrated in the figure. An asset is an abstract concept. It may represent a document, a file, and the like. Each asset may have its own metadata, such as Title, CreateTime, Authors, etc. Just like Title/CreateTime/Authors are properties of an asset, AssetId is another property of the asset, which may be used to uniquely identify the asset. Properties may be aspects of data stored separately, within the data itself, or as metadata. Moreover, the description is focused on attributes of properties such as property name, property type, and property value. Other attributes may also be utilized in mapping multi-values properties to combinations of tables for efficient SQL queries using the principles described herein.

As shown in FIG. 1, an example table 102 of single value properties may include properties of a document such as title, expiration date, version, and the like, all of which are searchable attributes of the document. For each property, a numeric or alpha-numeric asset identifier (or key) may be assigned tying the property to its asset. Each property has a name and a type. For example, the property "title" is a string type property, while the property "expiration date" is a date type property and the property "version" is an integer type property. The actual values of each of these properties are then given in the last column of table 102.

A table for multi-value properties 104 is similar to the single value property table 102 with regard to the first three columns which include the asset key, property name, and the property type. Because these properties may have multiple values, a separate column is included in table 104 for each value of a multi-value property. For example, the property "authors" is also a string type property with three different values, each comprising a name of one of the authors of the document. The property "modification date" may also be a multi-value property of date type and include up to a predefined number (in the example 3) of modification dates for the document. Finally, the example property "category" may be of integer type and include predefined categories assigned to the document (e.g. 1 may indicate a text document, 3 may indicate a formatted document, and 4 may indicate a language of the document).

Table 106 is an example of a mixed table of single value and multi-value properties. Because of the multi-value properties, the table needs to have as many value rows as the highest multi-value property. The values of the single value properties may be listed in the first property value column, while the others may use as many property value rows as the number of values they have.

The example properties provided above are just examples. Embodiments may be implemented with properties of other types, values, any number of values, and order of properties in the property table.

FIG. 2 is a conceptual diagram illustrating how single and multi-value properties are transformed into base and row-based tables to SQL based operations. Some embodiments may be implemented in service platforms of any form or configuration. Typically, a service platform is associated with multiple customers, whose clients are served through the platform based on the parameters and content provided by each customer. For example, a product support service for a computer products provider may provide support documents (and/or online help services) for a variety of products and components that may be part of the systems sold by the provider. These products and components may include hardware and software from various vendors and may involve licensing and similar permission issues. Thus, a service platform designed to provide a uniform support experience to the users of the product support service may receive documents from many sources with a number of single value and multi-value properties (some in form of metadata). The service platform may coordinate execution of queries on the stored documents by mapping user defined schemas to SQL tables and providing the results to the user.

Typical SQL queries cannot handle multi-value properties. Thus, each value of the property may have to be submitted (or stored) as a separate item rapidly complicating the query and storage processes. By mapping the single and multi-value properties of user defined schemas to a base table for single value properties and row-based tables for compatible types of multi-value properties, a number of tables necessary for storing the asset data and a complexity of SQL queries may be substantially reduced.

As shown in the figure, an abstract API 210 may receive a mixed table of single value and multi-value properties 206. First, a base table of single value properties 212 is created, where each single value property corresponds to one column. Then, the multi-value properties may be grouped according to their type. In one embodiment, compatible types (e.g. small integer, large integer) may also be combined in one group. A row-based table is then created for the properties in each group (e.g. row-based tables 214, 216, etc.), where each value of a property is stored in a separate row.

Base table 212 may include one (or two) identifier columns and a number of value columns equal to the number of properties. On the other hand, the multi-value properties may also have unique identifiers, but they also have multiple values and are grouped according to compatible types. Thus, the row-based tables (e.g. 214, 216, etc.) may include, in addition to the identifier column(s), a property name column and a single property value column (because each value if stored in a separate row).

The SQL-based database system comprising an SQL server 220 and data stores 222 may then store these tables and execute queries on them based on user requests. While embodiments are described focusing on SQL systems, the present invention is not so limited. Any database system with limitations similar to the SQL system (where multi-value properties cannot be handled the same way as single value properties) may employ the methods and structures described herein to map user defined schemas to a combination of tables to reduce a number of stored tables and complexity of queries.

Figure 3:
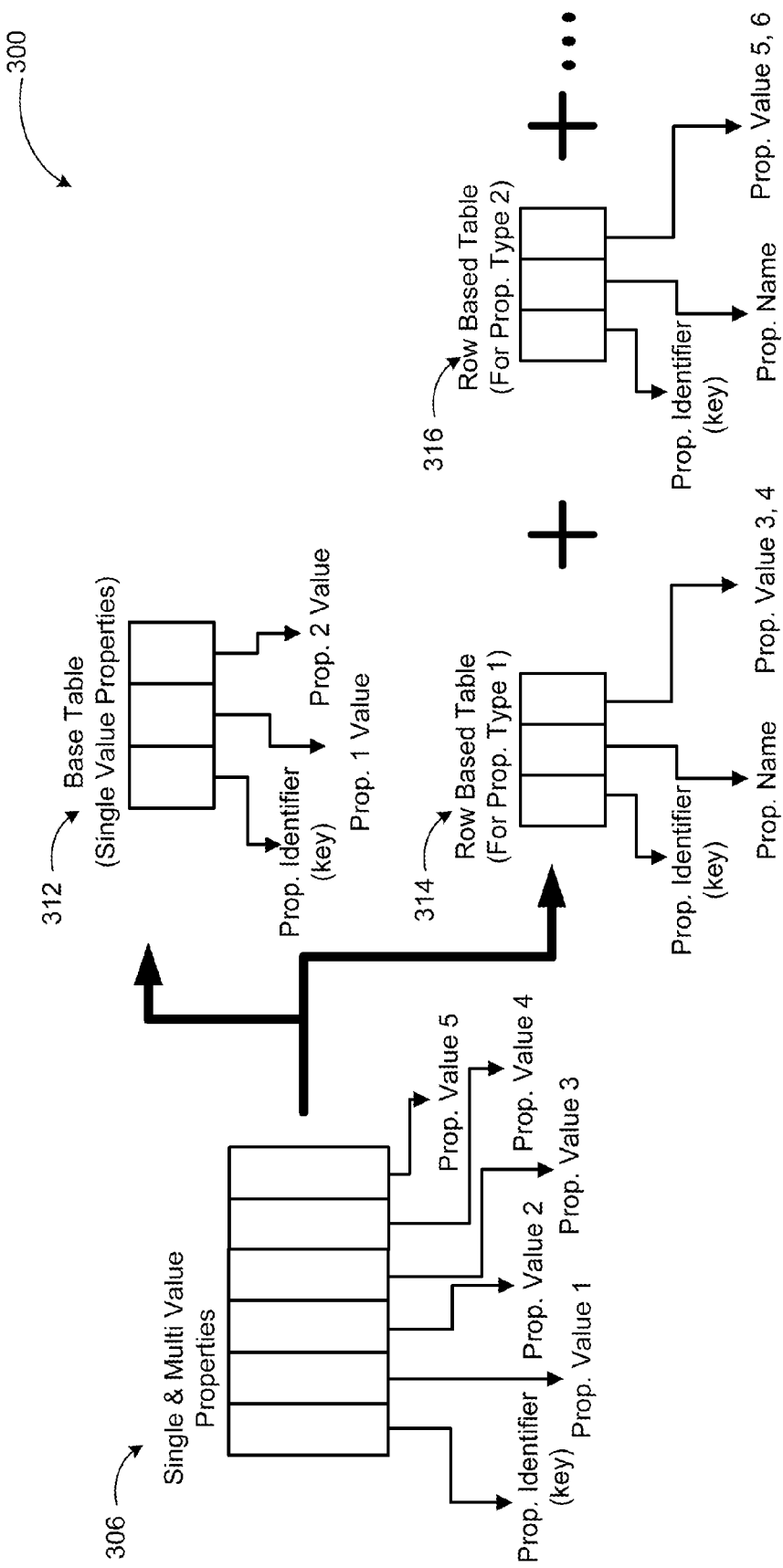
FIG. 3 illustrates an example mapping of a mix of single value and multi-value properties into a base table and two row-based tables for SQL operations.

FIG. 3 illustrates an example mapping of a mix of single value and multi-value properties into a base table and two row-based tables for SQL operations. As discussed above, a service platform may include a document store and a metadata store for storing documents and their metadata submitted by providers. A search index may be generated to perform efficient searches on the stored documents and metadata employing different filtering techniques and a provisioning service may manage provisioning of schemata among various metadata types submitted by different clients.

Providers may define the metadata schema to be used by the documents before submitting documents to the service platform. When these schemata are submitted, the service platform may assign a unique identifier to each schema. The service may then prefix this unique identifier to the name of each property in the schema to create a new, namespace decorated name which may be guaranteed to be unique across all schemata submitted to the service platform. A property with this decorated name may then be created in the search index schema. This is one example of creating asset keys.

The service platform may also track which schemata a document is associated with using a multi-valued metadata property to hold a list of schema names. At query time, the customer may specify that they wish to search over documents belonging to only one schema, or to documents belonging to any of a set of schemata. However, filtering over a multi-valued property is resource-expensive. Therefore, a table of single and multi-value properties may be used to generate a combination of optimized tables for the single and multi-value properties enabling reduction of storage space and complexity of SQL queries for the multi-value properties.

The mixed table 306 includes single and multi-value properties. According to some embodiments, all single value properties are grouped together and placed in the base table 312, which may include an asset identifier column and a column for each property value. The multi-value properties may be grouped according to their SQL type and then placed in row-based tables for each type. Each table (e.g. tables 314, 316, etc.) may include a column for asset identifier, a column for property name, and a row for each property value. Table 314 and 316 does not need the entry for type because the type is known.

For example, all multi-value properties of string type may be grouped in a single row-based table. Following the example table of FIG. 1, the names of the authors would each be placed in a separate row with the identifier (asset key) and property name columns being the same for all three names.

All properties of integer or date type may also be placed in separate tables for integers and dates, and so on.

As briefly mentioned above, the multi-value properties may further be combined based on compatible types. For example, a multi-value property of type nvarchar(100) and another multi-value property of type nvarchar(20) may be combined in a row-based table for nvarchar(100) type reducing the number of tables to be stored and queried even further.

Users can then access all the data using an object-oriented interface which treats all the columns in a similar way, regardless of whether they are multi-value or not. Moreover, by providing such an object-oriented API to access the data store, the underlying table layouts may be adjusted and create/read/update/delete operations optimized for the data store without affecting other components built on top of it.

While specific property indexing and filtering techniques are used and described, a system according to embodiments is not limited to the definitions and examples described above. Mapping user defined schema to base and row-based tables according to multi-value property type may be implemented using additional or fewer steps and techniques.

Figure 4:
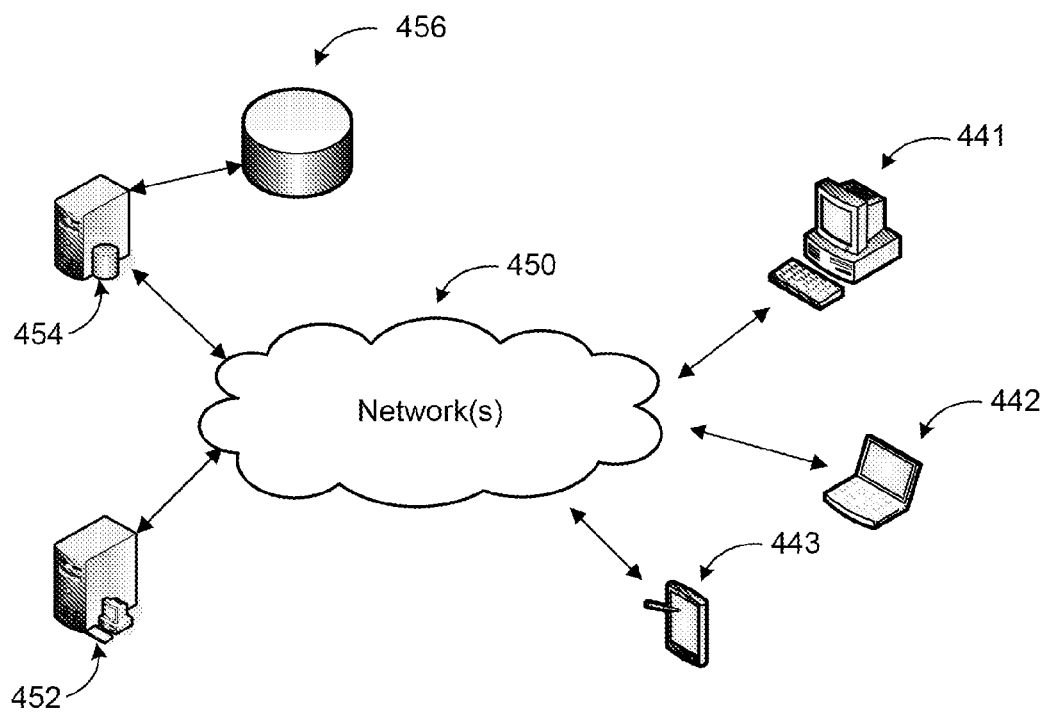
FIG. 4 is an example networked environment, where embodiments may be implemented.

FIG. 4 is an example networked environment, where embodiments may be implemented. Document storage and search systems using properties may be implemented locally on a single computing device or in a distributed manner over a number of physical and virtual clients and servers. They may also be implemented in un-clustered systems or clustered systems employing a number of nodes communicating over one or more networks (e.g. network(s) 450).

Such a system may comprise any topology of servers, clients, Internet service providers, and communication media. Also, the system may have a static or dynamic topology. The term "client" may refer to a client application or a client device. While a networked system implementing mapping user defined schema to base and row-based tables according to multi-value property type may involve many more components, relevant ones are discussed in conjunction with this figure.

A schema mapping API capable of mapping user defined schema to base and row-based tables according to embodiments may be implemented as part of a service platform in individual client devices 441-443 or executed in server 452 and accessed from anyone of the client devices (or applications). Data stores associated with searchable documents and their metadata may be embodied in a single data store such as data store 456 or distributed over a number of data stores associated with individual client devices, servers, and the like. Dedicated database servers (e.g. SQL database server 454) may be used to coordinate data retrieval and storage in one or more of such data stores.

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement mapping user defined schema to base and row-based tables according to multi-value property type. Furthermore, the networked environments discussed in FIG. 4 are for illustration purposes only. Embodiments are not limited to the example applications, modules, or processes.

Figure 5:
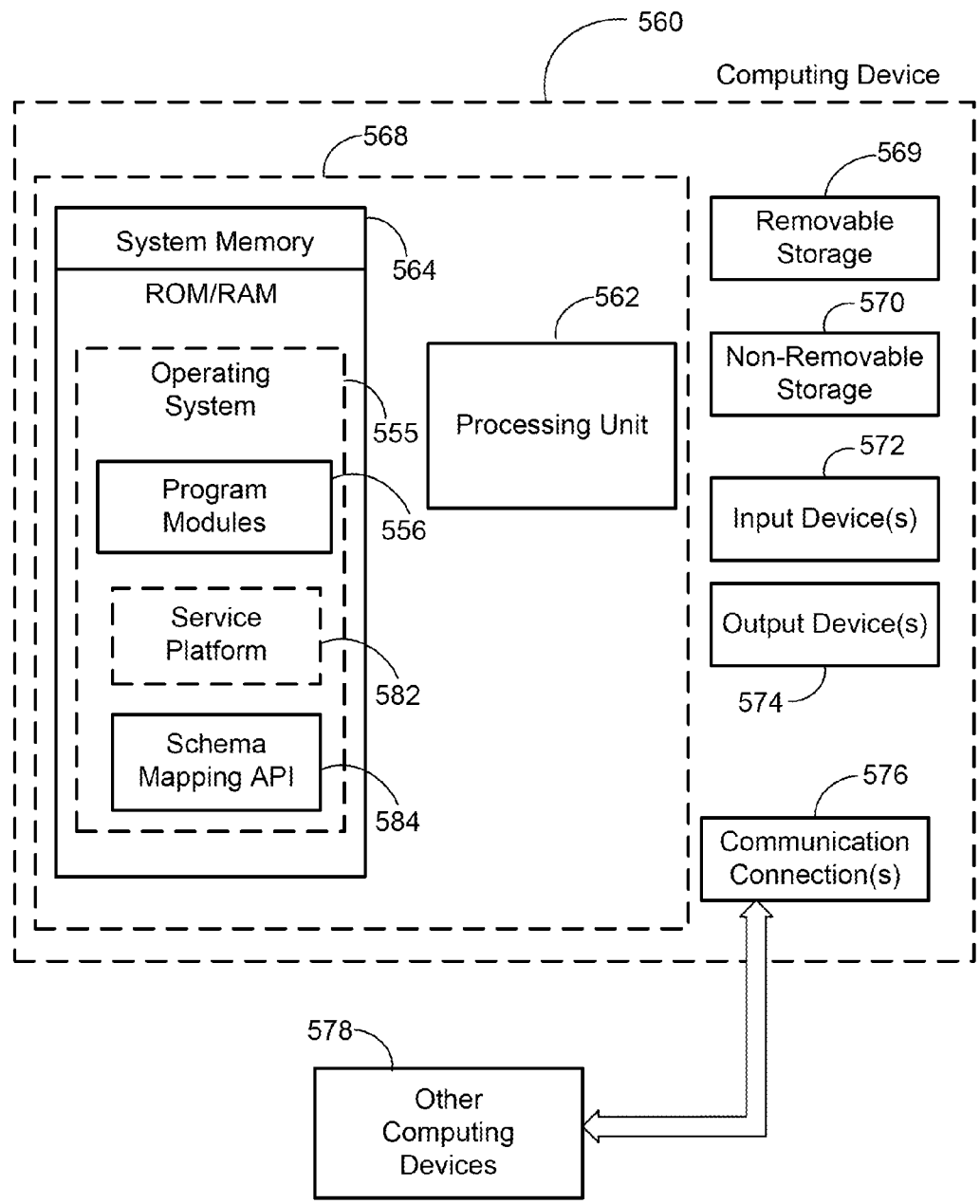
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 560. In a basic configuration, the computing device 560 may be a server providing document storage and/or search service and typically include at least one processing unit 562 and system memory 564. Computing device 560 may also include a plurality of processing units that cooperate in executing programs. Depending on the exact configuration and type of computing device, the system memory 564 may be volatile (such as RAM), non-volatile (such as ROM, flash memory, etc.) or some combination of the two. System memory 564 typically includes an operating system 565 suitable for controlling the operation of a networked computing device, such as the WINDOWS® operating systems from MICROSOFT CORPORATION of Redmond, Wash. The system memory 564 may also include one or more software applications such as program modules 566, optional service platform 582, and schema mapping API 584.

Service platform 582 may be an individual application or a cluster of interacting applications that provides a variety of services to clients associated with computing device 560. Schema mapping API 584 may map user defined schema to base and row-based tables according to multi-value property type, as described previously. This basic configuration is illustrated in FIG. 5 by those components within dashed line 568.

The computing device 560 may have additional features or functionality. For example, the computing device 560 may also include additional data storage devices (removable and/or non-removable) such as, for example, magnetic disks, optical disks, or tape. Such additional storage is illustrated in FIG. 5 by removable storage 569 and non-removable storage 570. Computer storage media may include volatile and non-volatile, removable and non-removable media implemented in any method or technology for storage of information, such as computer readable instructions, data structures, program modules, or other data. System memory 564, removable storage 569 and non-removable storage 570 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 560. Any such computer storage media may be part of device 560. Computing device 560 may also have input device(s) 572 such as keyboard, mouse, pen, voice input device, touch input device, etc. Output device(s) 574 such as a display, speakers, printer, etc. may also be included. These devices are well known in the art and need not be discussed at length here.

The computing device 560 may also contain communication connections 576 that allow the device to communicate with other computing devices 578, such as over a wireless network in a distributed computing environment, for example, an intranet or the Internet. Other computing devices 578 may include server(s) that provide access to document stores, user information, metadata, and so on. Communication connection 576 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
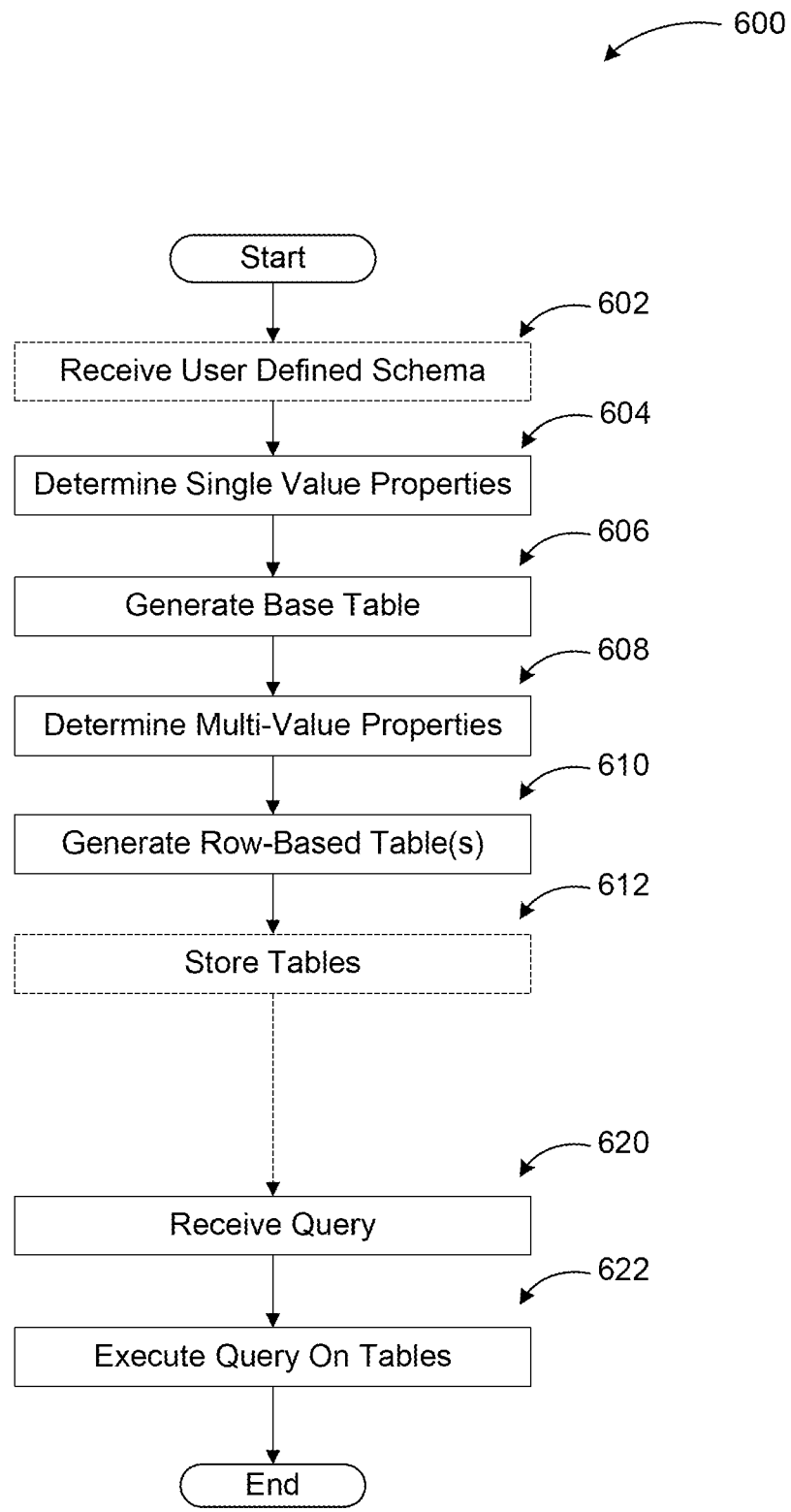
FIG. 6 illustrates a logic flow diagram of a process of creating base and row-based tables by mapping from single and multi-value properties according to embodiments.

FIG. 6 illustrates a logic flow diagram of a process of creating base and row-based tables by mapping from single and multi-value properties according to embodiments. Process 600 may be implemented as part of a document storage and/or search service.

Process 600 begins with optional operation 602, where a user defined schema is received. Since the mapping operations may be performed on existing data or during an update operation, the schema does not have to be received each time. Processing advances from optional operation 602 to operation 604.

At operation 604, single value properties are determined. Processing continues to operation 606 from operation 604.

At operation 606, a base table is generated using the single value elements. The base table may include a column for identifiers of each single value property and a column for each of the single value properties. Processing moves to operation 608 from operation 606.

At operation 608, multi-value properties are determined. Multi-value properties are grouped according to their property type in the SQL system. Processing moves to operation 610 from operation 608.

At operation 610, row-based tables are generated using the multi-value properties for each type. The row-based tables may include a column for asset identifier, a column for property name, and a column for property value, where each value of a multi-value property is stored in a separate row. According to another embodiment, the multi-value properties may also be grouped according to compatible types, where properties of two similar but distinct types may be combined into a single table. Processing advances from operation 610 to optional operation 612.

At optional operation 612, the tables may be stored in a database system managed by an SQL server. Operation 612 completes a first portion of the process of mapping schema properties to a combination of tables based on property type. A second portion of the process which is loosely coupled to the first portion as indicated by the dashed line in FIG. 6, begins at operation 620 following operation 612.

At operation 620, a query request is received by the platform that necessitates search of document sets previously associated with the single value and multi-value properties as described above. Processing advances from operation 620 to operation 622.

At operation 622, the query is executed on the tables optimizing create/read/update/delete operations on the asset data. After operation 622, processing moves to a calling process for further actions.

The operations included in process 600 are for illustration purposes. Mapping user defined schema to base and row-based tables based on multi-value property types according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computerized method to be executed at least in part in a computing device for storing and searching multi-value schema properties in a database system incapable of handling multi-value properties, the method comprising:
   determining single value properties associated with a schema, wherein the schema includes an assigned unique identifier,
   wherein the unique identifier serves as a prefix to a name for each of the multi-value properties,
   wherein the name comprises a unique namespace decorated name for the schema,
   wherein the decorated name is utilized to create a property in a search index schema to create an asset key;
   generating a base table using the single value properties;
   determining the multi-value properties;
   generating a row-based table for each of a plurality of distinct multi-value property types using the multi-value properties,
   wherein the plurality of distinct multi-value property types comprises a plurality of string types, a plurality of integer types and a date type,
   wherein each row-based table is generated for a group of compatible ones of the distinct multi-value property types,
   wherein the group of compatible ones of the distinct multi-value property types comprises two distinct string multi-value property types comprising strings of varying lengths;
   storing the base table and the row-based tables in the database system,
   wherein storing the row-based tables comprises storing at least one row-based table comprising the group of compatible ones of the distinct multi-value property types to reduce a total number of the row-based tables stored and to reduce a total number of the row-based tables queried; and
   executing a query based on a user request for the schema on the base table and the row-based tables associated with the schema,
   wherein each row-based table includes a property identifier column, a property name column and a property value column.

2. The method of claim 1, wherein the base table includes a property identifier column and an additional column for each single value property associated with the schema.

3. The method of claim 2, wherein each value of a multi-value property is stored in a separate row in the row-based table.

4. The method of claim 1, wherein the multi-value property type includes one of: big integer, integer, small integer, string, date, time, Boolean value, timestamp, and unique identifier.

5. The method of claim 1, further comprising:
performing at least one from a set of: a create, a read, an update, and a delete operation for any one of the properties utilizing the base table and the row-based tables.

6. The method of claim 1, wherein the database system is a Structured Query Language (SQL) system.

7. A system for mapping multi-value schema properties in an SQL database system, the system comprising:
a memory;
a processor coupled to the memory, capable of executing an Application Programming Interface (API) configured to:
receive a user-defined schema, wherein the schema includes an assigned unique identifier,
wherein the unique identifier serves as a prefix to a name for each of the multi-value properties,
wherein the name comprises a unique namespace decorated name for the schema,
wherein the decorated name is utilized to create a property in a search index schema to create an asset key;
determine single value properties associated with the schema;
generate a base table for the single value properties;
determine multi-value properties associated with the schema;
generate at least one row-based table for the multi-value properties based on a plurality of compatible multi-value property types,
wherein the plurality of compatible multi-value property types comprises a plurality of distinct string types, a plurality of distinct integer types and a date type,
wherein the at least one row-based table is generated for a group comprising the compatible multi-value property types,
wherein the group of compatible multi-value property types comprises two distinct string multi-value property types comprising strings of varying lengths;
enable storage of the base table and the at least one row-based table in a data store associated with the system, wherein the at least one row-based table is stored as at least one row-based table comprising the group of compatible multi-value property types to reduce a total number of row-based tables stored and to reduce a total number of row-based tables queried; and
enable execution of queries associated with the schema on the base table and the at least one row-based table, wherein each row-based table includes a property identifier column, a property name column and a property value column.

8. The system of claim 7, wherein the API is further configured to assign unique identifiers to each single value and multi-value property.

9. The system of claim 7, wherein each value of a multi-value property is stored in a separate row of a corresponding row-based table.

10. The system of claim 7, wherein each single value property is stored in a separate column of the base table.

11. The system of claim 7, further comprising:
a metadata store for storing the schema; and
a document store for storing documents associated with the schema.

12. A computer-readable storage medium with instructions encoded thereon for mapping multi-value schema properties in an SQL database system, the instructions comprising:
receiving a user-defined schema,
wherein the schema includes an assigned unique identifier, wherein the unique identifier serves as a prefix to a name for each of the multi-value properties,
wherein the name comprises a unique namespace decorated name for the schema, wherein the decorated name is utilized to create a property in a search index schema to create an asset key;
determining single value properties associated with the schema;
assigning a unique identifier to each single value property;
generating a base table for the single value properties;
determining multi-value properties associated with the schema;
assigning a unique identifier to each multi-value property;
generating a at least one row-based table for the multi-value properties based on a plurality of compatible multi-value property types,
wherein the plurality of compatible multi-value property types comprises a plurality of distinct string types, a plurality of distinct integer types and a date type,
wherein the at least one row-based table is generated for a group comprising the compatible multi-value property types,
wherein the group of compatible multi-value property types comprises two distinct string multi-value property types comprising strings of varying lengths;
storing the base table and the at least one row-based table in the SQL database system, wherein storing the at least one row-based table comprises storing at least one row-based table comprising the group of compatible ones of the distinct multi-value property types to reduce a total number of row-based tables stored and to reduce a total number of row-based tables queried; and
enabling a query for performing a search on the properties associated with the schema to be executed on the base table and the at least one row-based table associated with the schema,
wherein each row-based table includes a property identifier column, a property name column and a property value column.

13. The computer-readable storage medium of claim 12, wherein the instructions further comprise:
enabling performance of at least one from a set of a create, a read, an update, and a delete operation on the singe value and the multi-value properties using the base table and the row-based tables.

* * * * *